March 17, 1970   HARUO ITO   3,501,694
OHMMETER CIRCUIT HAVING STABILIZING CIRCUIT WHICH REDUCES
THE EFFECT OF SOURCE VARIATIONS ON INDICATION
Filed April 22, 1968
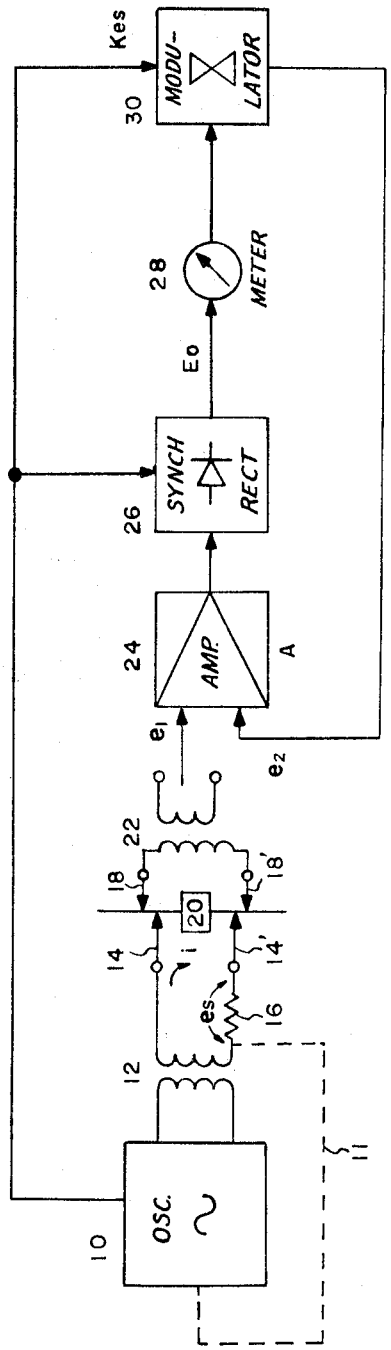
INVENTOR
HARUO ITO
BY  *A. C. Smith*
ATTORNEY 3,501,694
Patented Mar. 17, 1970

3,501,694
OHMMETER CIRCUIT HAVING STABILIZING CIRCUIT WHICH REDUCES THE EFFECT OF SOURCE VARIATIONS ON INDICATION
Haruo Ito, Tokyo, Japan, assignor to Yokogawa-Hewlett-Packard, Ltd., Tokyo, Japan, a corporation of Japan
Filed Apr. 22, 1968, Ser. No. 722,847
Claims priority, application Japan, May 18, 1967, 42/31,226
Int. Cl. G01r 27/02, 27/14
U.S. Cl. 324—62            5 Claims

ABSTRACT OF THE DISCLOSURE

A resistance-measuring meter includes a signal source that provides a constant AC current to an unknown resistance through a pair of current-carrying leads and an amplifier circuit is connected through another pair of leads to receive and amplify the voltage signal generated between the two ends of the unknown resistance. A meter circuit is connected to respond to the in-phase component of the amplified voltage signal and includes a modulator which receives an AC signal related to the output of said signal source for modulating the signal supplied to an indicating meter. This modulated signal is negatively fed back to the input of said amplifier circuit to remove errors in indication due to signal source fluctuations.

BACKGROUND OF THE INVENTION

Certain known resistance meters for measuring contact resistance supply current to an unknown resistance through one pair of conductors and measure the resultant voltage drop across the unknown resistance using another pair of conductors. This conventional 4-conductor method requires a current adjusting element for regulating the current supplied to the unknown resistance and relies on such adjusting element for correcting the indicator. However, the current supplied to the unknown resistance is not continuously corrected against such factors as power source fluctuation, temperature changes, and the like.

SUMMARY OF THE INVENTION

In accordance with the illustrated embodiment of this invention, the AC voltage signal which is generated across the unknown resistance is amplified and rectified and this rectified output is modulated to provide an AC signal which is related to the AC current supplied to the unknown resistance. This modulated signal is fed back negatively to the input circuit of the amplifier which receives AC voltage signals across the unknown resistance for eliminating the effect of fluctuations in the AC signal supplied to the unknown resistance.

DESCRIPTION OF THE DRAWING

The drawing shows a circuit diagram of the resistance measuring circuit according to the preferred embodiment of this invention.

DESCRIPTION OF THE PREFERRED EMBODIMENT

Referring to the drawing, there is shown a constant-frequency oscillator circuit 10 of a constant amplitude which is connected through an output transformer 12 and a pair of measuring-current conductors 14 and 14' to the unknown resistance 20. The unknown resistance 20 thus receives the measuring AC current $i$ through the circuit including the secondary winding of transformer 12 and the reference resistance 16 which is serially connected in one of the pair of current conductors 14 and 14'. A pair of voltage-measuring conductors 18 and 18' are adapted to receive the potential drop which appears between the two ends of the unknown resistance 20. The voltage-measuring conductors 18 and 18' are connected to the primary winding of transformer 22, the secondary winding of which is connected to one input of differential amplifier 24 for supplying thereto a voltage $e_1$ related to the potential drop which appears across the unknown resistance 20. A synchronous rectifier circuit 26 receives the output AC signal of the differential amplifier 24 and receives a signal from the source 10 of oscillations for producing a DC signal $E_o$ that corresponds to the magnitude of a signal component which is in phase with the source 10. This signal $E_o$ is applied to an indicator meter 28 and to a modulator 30 which modulates the output of the source 10 in response to the output $E_o$ of the synchronous rectifier circuit 26. The output $e_2$ of modulator 30 is an AC signal $e_2$ which is proportional to the output of the source 10 and which is in phase therewith and this signal $e_2$ is fed back negatively to the other input of the differential amplifier 24.

The resistance value $R_s$ of reference resistance 16 is selected sufficiently large in comparison with an unknown resistance $R_x$ so that an alternating signal current of substantially constant amplitude will flow in the unknown resistance 20 due to the AC signal of substantially constant amplitude supplied through transformer 12 by the source 10 of oscillations. Consequently, the AC signal $e_1$ impressed on one input of differential amplifier circuit 24 and the DC output $E_o$ of synchronous rectifier circuit 26 will be proportional in a linear fashion to the magnitude of the resistance $R_x$ of the unknown 20. The indicator 28 may be calibrated in resistance values and the output $E_o$ will produce a direct reading of $R_x$ in units of resistance from the needle position of indicator 28.

However, in case the current $i$ supplied to an unknown resistance 20 is varied as the output of the source 10 of oscillations 10 fluctuates with time or temperature changes, the indication of resistance provided by indicator 28 is also varied. These variations in resistance indication are eliminated by converting the DC signal $E_o$ from the synchronous rectifier 26 into an AC signal $e_2$ by means of modulator 30, and feeding this voltage $e_2$ back negatively to the other input of differential amplifier 24 in phase with $e_1$. This compensating effect can be expressed by the following formulas:

$$A\eta(e_1-e_2)=E_o \qquad (1)$$

$$e_1=f(X)f(Y)e_s \qquad (2)$$

$$e_2=k \cdot f(Y) \cdot Ke_sE_o \qquad (3)$$

Where A is the gain of amplifier 24, $\eta$ is the rectifying efficiency of rectifying circuit 26, $f(X)$ is the linear function of test piece resistance $R_x$, $f(Y)$ is the output regulation of oscillation 10, $[k]=[v]^{-1}$, K is proportional constant, and $e_s$ is the AC voltage across reference resistance 16 which is produced by the test current $i$.

From Formulas 2 and 3, Formula 1 can be expressed as follows:

$$A\eta\{f(X)f(Y)e_s-k \cdot f(Y) \cdot Ke_s \cdot E_o\}=E_o \qquad (4)$$

$$E_o=\frac{A\eta f(X)f(Y)e_s}{1+A\eta kf(Y)Ke_s} \qquad (4')$$

Therefore, in Formula 4', if $$1 \ll A\eta kf(Y)Ke_s$$

then $$E=f(X)/kK \qquad (5)$$

As will be clear from the above Expression 5, the DC output $E_o$ supplied to indicator 28 is a factor solely of the resistance $R_x$ of the unknown 20, and therefore, fluctuations of the output of oscillator 10 do not affect the indication of resistance on indicator 28.

Further, with reference to the oscillator circuit 10 of this invention, it may include an oscillation-sustaining feedback circuit which derives the feedback voltage from the ends of the reference resistance 16, as shown by broken line 11, so that the oscillations start only after an unknown resistance 20 is connected between the pair of measuring-current conductors 14 and 14'. Also, this invention may even use an ordinary rectifier circuit in place of the synchronous rectifying circuit 26.

This invention is conveniently useful for measuring contact resistances of relay contacts, the resistance of conductors or semiconductors, and generally for measuring relatively low values of resistance.

What is claimed is:

1. A resistance-measuring meter circuit comprising:
   an oscillator circuit for supplying a substantially constant amplitude alternating signal to an unknown resistance element under test;
   sensing means for producing a signal in response to the potential drop appearing across said unknown element;
   circuit means having a pair of inputs for producing an output signal as the combination of signals appearing on said inputs, one of said inputs being connected to receive signal from said sensing means;
   modulator means connected to receive said output signal and alternating signal from said oscillator circuit for producing a control signal related to the amplitude of said output signal;
   feedback means connected to said modulator means for supplying said control signal to the other input of said circuit means in negative feedback relationship to stabilize the amplitude of said output signal against variations in the amplitude of the alternating signal from said oscillator circuit for a given unknown resistance element under test; and
   indicator means connected to receive said output signal for providing a direct indication of the resistance of the unknown resistance element under test.

2. A resistance-measuring meter circuit as in claim 1 wherein:
   said oscillator circuit supplies a substantially constant-amplitude alternating current to the unknown resistance element under test.

3. A resistance-measuring meter circuit as in claim 1 wherein said oscillator circuit comprises:
   means including a reference resistance element for connecting said oscillator circuit to an unknown resistance element under test for producing a reference potential drop across said reference resistance element in response to connection of an unknown resistance element to receive alternating signal from said oscillator circuit; and
   means are provided for supplying the reference potential drop which appears across the reference resistance element to the oscillator circuit in oscillation-sustaining relationship.

4. A resistance-measuring meter circuit as in claim 1 wherein said circuit means comprises:
   a differential amplifier having one input connected to receive the potential drop which appears across an unknown resistance element and having another input connected to receive said control signal; and
   rectifier means connected to the output of said amplifier for producing said output signal as a unidirectional signal representative of the alternating potential drop which appears across the unknown resistance element under test.

5. A resistance-measuring meter circuit as in claim 4 wherein said rectifier means is connected to receive alternating signal from said oscillator circuit for synchronously rectifying alternating signal applied thereto from said amplifier to produce said output signal as a unidirectional signal representative only of the alternating potential drop across the resistive component of an unknown resistance element.

References Cited

UNITED STATES PATENTS 3,387,776   6/1968   Stillwell et al. _____ 324—61

OTHER REFERENCES

Graham, R., The Con–VI, Radio and Television News, pp. 84, 85, 162, October 1953, TK6540.R623.

EDWARD E. KUBASIEWICZ, Primary Examiner